United States Patent [19]

Manin

[11] 4,136,754

[45] Jan. 30, 1979

[54] PROCESS FOR SEISMIC EXPLORATION BY MEANS OF A DIRECTIVE SOURCE

[75] Inventor: Michel Manin, Massy, France

[73] Assignee: Compagnie General de Geophysique, Massy, France

[21] Appl. No.: 804,455

[22] Filed: Jun. 7, 1977

[30] Foreign Application Priority Data

Jun. 17, 1976 [FR] France ............................. 76 18420

[51] Int. Cl.² ........................................ G01V 1/13
[52] U.S. Cl. ............................. 181/111; 340/7 R; 340/15.5 R; 102/23; 102/24 HC
[58] Field of Search ............... 340/7, 9, 15.5 R; 181/106, 111; 102/22, 23, 24 HC; 116/23

[56] References Cited

U.S. PATENT DOCUMENTS

| | | | |
|---|---|---|---|
| 2,340,314 | 2/1944 | Farnham | 102/23 |
| 2,609,885 | 9/1952 | Silverman | 102/23 |
| 2,630,188 | 3/1953 | Hawkins et al. | 102/22 |
| 2,693,245 | 11/1954 | Hawkins | 102/DIG. 2 |
| 2,757,750 | 8/1956 | Hawkins et al. | 102/24 HC |
| 2,770,312 | 11/1956 | Silverman | 181/106 |
| 2,908,342 | 10/1959 | Itria et al. | 181/111 |
| 3,256,501 | 6/1966 | Smith | 340/7 R |
| 3,775,984 | 12/1973 | Livingston | 102/23 |
| 3,973,497 | 8/1976 | Coorsen | 102/23 |
| 4,064,479 | 12/1977 | Ruehle | 340/7 R |

*Primary Examiner*—Nelson Moskowitz
*Attorney, Agent, or Firm*—Beall & Jeffery

[57] ABSTRACT

The invention concerns a process for seismic exploration. It consists in simultaneously emitting disturbances from a plurality of sources S1 ... Sn immersed at various depths and positions chosen so as to maximize the power transmitted vertically and to minimize the power transmitted in certain determined oblique directions. The reflected or refracted seismic signals are gathered by hydrophones. By this means certain parasitic refractions are eliminated.

23 Claims, 9 Drawing Figures

PROCESS FOR SEISMIC EXPLORATION BY MEANS OF A DIRECTIVE SOURCE

BACKGROUND OF THE INVENTION

1. Field of the Invention

The present invention concerns a process for geophysical exploration by means of measuring the propagation of vibrations in the ground, which is called seismic measuring.

2. The Prior Art

The known principle for seismic exploration consists in creating, through a violent shock such as an explosion, a disturbance which is propogated through the ground at variable speeds depending on the nature of the terrain traversed.

In particular, the disturbances are reflected and refracted when they reach the interfaces between layers of terrain whose propagation speeds are different.

Many seismic vibration collectors are distributed at appropriate locations to detect the arrival of the disturbances and thus gather information on the nature of the terrain below the surface of the ground.

These methods are in particular applicable to the exploration of subsoil covered by the sea, and in this case, the disturbance sources are placed below seal level (for example a few meters deep); the disturbances are propagated to the bottom and are transmitted to the interior of the ground where they encounter obstacles or successive layers of terrain which cause refractions and reflections; the reflected or refracted disturbances return and are propagated through the water to the surface where they are detected by hydrophones (vibration collectors) placed slightly below the surface of the water.

There is a particular problem in marine seismic exploration when the sea bottom has a propagation speed characteristic very different from that of the propagation speed in water. The latter is practically always equal to 1500 meters per second, and one often finds sea bottoms with much greater speeds. The disturbances emitted in water at a few meters depth are propagated to the bottom; a portion penetrates by refraction into the ground, but the remainder is reflected and starts again towards the surface where it is detected by the hydrophones.

Not only are these waves not useful because they bear no information on the nature of the subsoil, but also they interfere with the useful waves which have penetrated into the ground and have come out of it after reflection, thus confusing the seismic recordings, the utilization of which is already very complex.

In particular, all the disturbance waves arriving at the bottom with an incidence greater than the total angle of refraction are integrally reflected upwardly.

According to the laws of refraction, the critical angle of total reflection taken in relation to the perpendicular to the surface of the sea bottom (vertical) is that where the sine is equal to the relation between the propagation speed in water (propagation medium for the incident wave) and the propagation speed in the superficial layer of the sea bottom (propagation medium of the refracted wave).

For a sea bottom speed of 3000 m/s, the incidence of total reflection is only 30 degrees. For a faster speed, it is even smaller, and all the disturbance waves emitted with a greater incidence are a total loss and, through their reflections on the bottom and their refraction along this bottom, they spoil the utilization of the useful seismic signals.

The usual seismic sources are omnidirectional and the energy they emit outside of the vertical cone from angle to summit equal to the critical incidence of total reflection is lost.

SUMMARY OF THE INVENTION

To provide a remedy for this inconvenience, the present invention proposes to perform seismic exploration by means of a group of disturbance sources arranged so as to give a certain directivity to the power of the disturbance waves emitted in the aggregate by the group of sources and in particular in such a way as to reduce to the maximum extent possible the power transmitted in the certain directions where it is annoying.

More precisely, the energy emitted in the direction of the critical incidence of total reflection is particularly harmful because the coefficient of reflection is maximum for this incidence.

Consequently, according to the invention, a preferred criterion for the directivity of the group of sources is the optimization of the relation of the energy emitted vertically to the energy emitted in another direction which in practice can be the direction of the critical incidence of total reflection, but can also be another direction if the need is felt to eliminate the reflections in this direction.

This criterion is satisfied according to the invention by giving the elementary sources of the group positions and depths such that the relation of the average spectral density of power transmitted vertically downwardly to the average spectral density of power in the said other direction, for a band of determined sound frequencies, is greater than the value of this relation for sources aligned at the same depth. It is well understood that the preferred positions and depths for the sources are those which maximize this relation.

The sources are immersed in a liquid (marine exploration) or solid (terrestrial exploration) medium and the depths are considered in relation to the interface between the medium containing the sources and the terrestrial atmosphere.

During each elementary measurement, the elementary sources of the group are activated and the compound signals resulting from superpositions of the reflections of the various disturbances emitted during this elementary measurement are recorded by seismic collectors (geophones or hydrophones).

The disturbances can be simultaneously released for all the sources or slightly spaced from one another, taking into account that these spacings can also improve the directivity if they are established in an appropriate fashion.

In particular, if the positions and depths of the sources are chosen so as to obtain a good relation between the average spectral density of vertical power and the average spectral density of power in a given direction, the modification of the spacing times between the releases of the sources allows the particular direction along which it is desired to reduce the emitted power to be modified at will. The simple spacing of the times of releasing the sources at the same depth already gives a certain directivity to the power transmitted.

Still according to the invention, the positions and the release times for the individual sources are preferably determined to optimize the relation of the average spectral densities of power vertically and in another direction by taking into consideration not the power emitted by the sources as a whole but the power transmitted in the aggregate (mass) in these two directions, bearing in mind that the sources are at a slight depth below the interface with the terrestrial atmosphere and that this latter acts as a mirror which reflects almost all the disturbances, these relections interferring with the disturbances directly issuing from the sources to modify the distribution of the energy leaving from the aggregate to the subsoil.

A particular arrangement to obtain good directivity of the source consists in placing the sources along a curved line having its concavity turned upwardly, or in a cup shaped configuration turned upwardly if the directivity must be considered in a three dimensional space and not simply in a plane.

Lastly, it is possible according to the invention to optimize even more the reduction of the power transmitted in a particular direction by giving different amplitudes to the sources.

BRIEF DESCRIPTION OF THE DRAWINGS

Other characteristics and advantages of the invention will appear in the detailed description which follows and which is made in reference to the attached drawings in which.

DETAILED DESCRIPTION OF THE INVENTION

Figure 1:
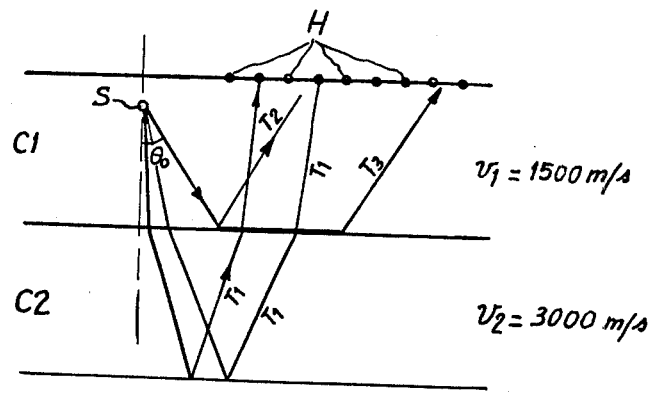
FIG. 1 schematically represents a known process for marine seismic exploration.

Represented in FIG. 1 is a single disturbance source S immersed in the sea which is a medium C1 having a propagation speed $v_1$ of about 1500 m/s.

The sea bottom is supposed to be constituted by a layer of terrain C2 having a propagation speed $v_2$ distinctly greater than $v_1$, here $v_2 = 3000$ m/s.

The sound waves of the disturbances produced by source S are reflected and/or refracted in the layer of terrain C2, but the waves having an angle of incidence greater than a particular value $\theta_0$ are completely reflected by layer C2 (trajectory T2) and cannot be used to study the internal structure of the latter, as is also the case of those which are refracted along the bottom of the sea (trajectory T3) and rebound with incidence $\theta_0$.

This angle $\theta_0$ is such that sine $\theta_0 = v_1/v_2$.

The disturbances reflected to the inside of layer C2 reach a series of aligned collectors or hydrophones H floating on the surface of the sea. It can be seen that the waves returned by total reflection or refraction on the layer C2, and especially those where the angle of incidence is close to the critical angle $\theta_0$, interfere with the useful waves coming from reflections inside the ground.

The most bothersome waves are those which reach the bottom with incidence equal to $\theta_0$ because the coefficient of reflection at this incidence is maximum and equal to 1. On this side of $\theta_0$ there is partial refraction, on the other side there is dispersion.

Consequently, the object of the present invention is to reduce as much as possible the waves emitted by source S along incidences close to $\theta_0$.

For this, several sources intended to function together to obtain a certain downward directivity are used.

Figure 2:
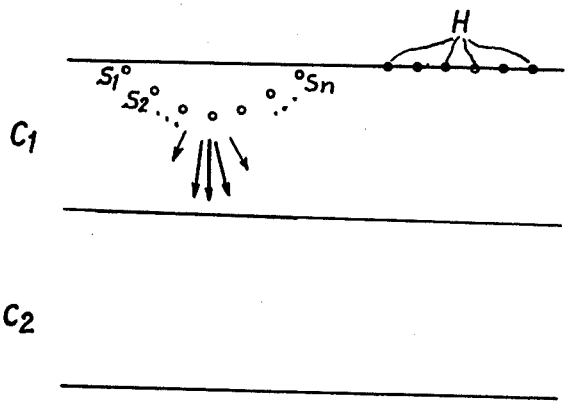
FIG. 2 schematically represents the operation of the process according to the invention.

In FIG. 2 is shown in a general manner the operation of the process according to the invention, which consists in utilizing several sources S1, S2 . . . Sn placed according to a configuration such that the power emitted either in the direction $\theta_0$ (or in the neighborhood of the latter) is as large as possible or in any case greater than that which can be obtained, for example, by arranging several sources horizontally or vertically.

In FIG. 2, it is supposed that the sources are arranged in a vertical plane which is the plane in which it is desired to study the subsoil and consequently in which is placed the alignment of hydrophones H.

The configuration chosen for the distrubance sources S1 to Sn is more precisely determined in such a way that the relation of powers indicated hereinabove are as high as possible on an average for a band of sound frequencies in the spectral domain emitted by the source and are interesting for the seismic exploration being made. This frequency band can be, for example, from 20 to 40 Hertz.

The criterion adopted for the optimization of the configuration of the sources which yields a good gain in the downward vertical direction and a substantial reduction in signal strength in the $\theta_0$ direction is the maximization of the relation of the average spectral density (in the chosen frequency band) of the power of the sound waves transmitted towards the bottom to the average spectral density in the $\theta_0$ direction.

Several expressions for the power are possible and, according to a particularly interesting characteristic of the invention, the expression of the power used for the optimization of the relation of the preceding powers takes into account the disturbances reflected by the water-air interface above the immersed sources (reflection practically total because of the weak propagation speed of the disturbances in the air: 330 m/s). This is done easily by considering that each source Sj (j = 1 to n) is associated with an imaginary "phantom" source having a position symmetrical with that of the real source Sj in relation to the interface between the sea and the atmosphere.

The amplitude of the disturbances can be expressed as a function of the frequency f and the angle of incidence of the disturbance waves according to the following formulation where $A_\theta(f)$ is the amplitude for an angle $\theta$ and a determined frequency f, Pj and xj respectively represent the depth and the abscissa of each source Sj (j = 1 to n), V1 the propagation speed in water:

$$A_\theta(f) = \text{modulus of } (2i \sum_{j=1}^{n} \sin(2\pi f \frac{P_j}{V_1} \cos \theta) e^{2i\pi f \frac{x_j}{V_1} \sin \theta}),$$

i being the imaginary unit number. The square of this value, a function of the frequency f, represents a spectral density of the power transmitted in a direction forming an angle $\theta$ with the vertical.

This formula takes into account the phantom sources associated with the real sources Sj. It supposes that the disturbance sources are activated simultaneously, that they have a uniform spectrum of frequencies emitted in the interesting band, that they have equal amplitudes (supposedly unitary), and that moreover all the sources are practically omnidirectional. It will be shown which modification can be applied when these conditions are not fulfilled.

The particular value of the amplitude transmitted vertically towards the bottom ($\theta = 0$) is $$A_0(f) = \text{modulus of } (2i \sum_{j=1}^{n} \sin (2\pi f \frac{P_j}{v_1}))$$

To optimize the directivity of the complex source composed of several elementary sources, we can try to optimize the relation $$F_\theta(f) = [A_\theta(f)/A_0(f)]$$

for a determined band of frequencies $\Delta f$.

Thus the average of this relation in the frequency band is calculated, for example by evaluating the quantity $(1/\Delta f) \int_{\Delta f} F_\theta(f) \, df$ or evaluating the logarithmic average $(1 \Delta \log f) \int F_\theta(f) \, d (\log f)$ if the relation $F_\theta(f)$ is traced according to a logarithmic function of the frequency or still by evaluating the simple or logarithmic average of $F_0^2(f)$.

Thus is obtained, in a determined frequency band, an average of the relation of the spectral densities of power in both defined directions.

This average is a function of the position variables xj and pj of the elementary sources Sj, and the suitable positions of the sources in the process according to the invention are those which give a sufficient value to the average $F_\theta(f)$, and in particular a value greater than that which can be obtained when all the depths of the sources pj are identical.

It is obvious that a large number of source positions can be suitable because the function to be optimized comprises a number of variables equal to twice the number of sources, and that the optimization functions of the functions of several variables does not lead to a single solution.

Even if the positions are not optimal in the mathematical meaning of the term, a large number of positions will be suitable according to the invention if they lead to a relation of average spectral densities which is distinctly less than 1 (for example $-20$dB).

Since source positions cannot be given in an exhaustive manner and since many diverse methods of calculation are known to adequately choose the variables (here, Pj and xj) which optimize a given function [here the average $F_{74}(f)$ on a band $\Delta f$], only examples illustrating the solution according to the invention and the results obtained are shown here.

Figure 3A:
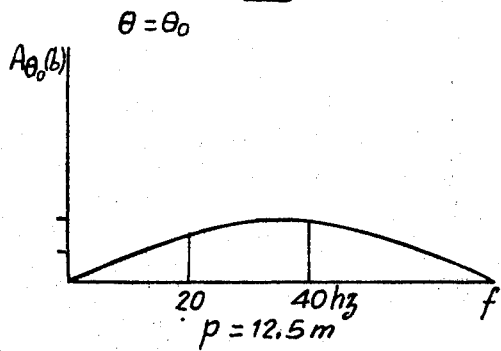
FIGS. 3a and 3b represent the spectral densities of power respectively transmitted according to an angle of 30° (angle of total reflection for a bottom speed of 3000 m/s) and vertically for a single source immersed 12.5 meters in depth.

Represented in FIG. 3a is an evaluation of the amplitude of the disturbances transmitted from a single source immersed to a depth of 12.50 meters. This amplitude is traced as a function of the frequency f around the 20 to 40 Hertz band.

Figure 3B:
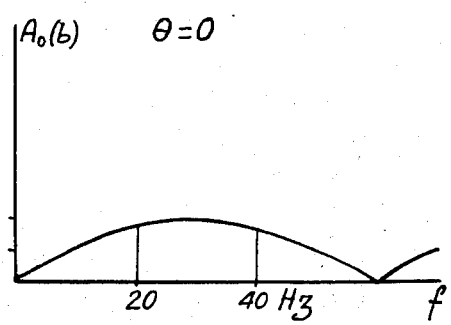

In FIG. 3b, the same amplitude is represented for angle $\theta = 0$, for the same frequency band. It is seen that the source is practically omnidirectional because there is no reduction in power in the $\theta_0$ direction particularly in relation to the power transmitted vertically.

Figure 4A:
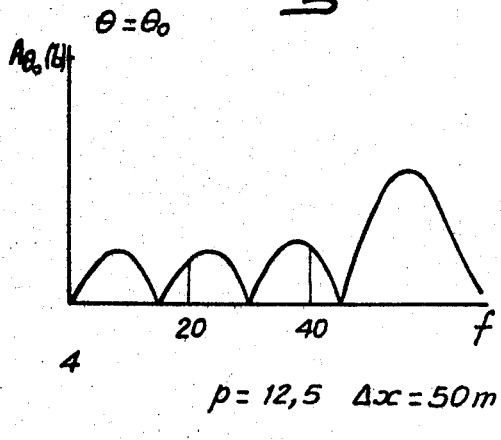
FIGS. 4a and 4b represent the same spectral densities for four sources at a depth of 12.50 meters, separated by 50 meters.

Shown in FIG. 4a is the same amplitude as a function of the frequency for four immersed sources horizontally aligned at the same depth of 12.50 meters and separated from each other by a distance of 50 meters.

Figure 4B:
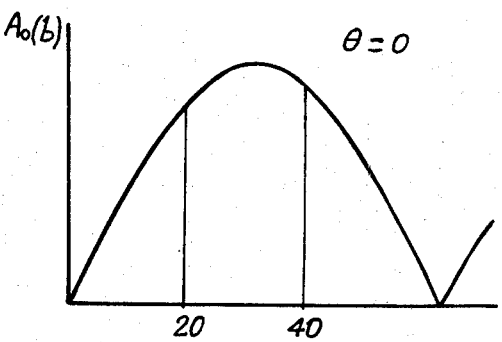

In FIG. 4b, the amplitude is represented in the downwardly vertical direction for the same frequency band.

It is seen that the average amplitude transmitted vertically is much greater than that which is transmitted in the $\theta_0$ direction. By using four sources at the same depth, a certain gain and a certain emission directivity have been achieved.

Figure 5A:
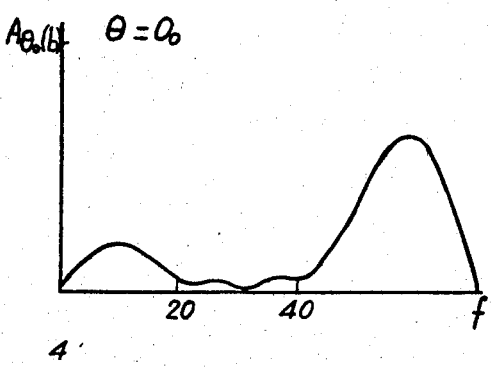
FIGS. 5a and 5b represent the same spectral densities for four sources at different depths separated by 50 meters.

Represented in FIG. 5a is the amplitude as a function of the frequency for four sources placed at different depths, always separated from each other by 50 meters, the depths being judiciously chosen so that the amplitude is on the average as weak as possible in the 20 to 40 Hertz band. The depths chosen are respectively 4 meters, 12 meters, 12 meters and 4 meters.

Figure 5B:
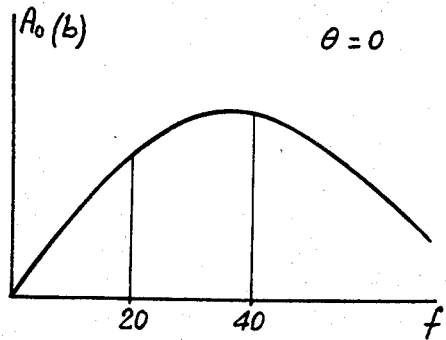

In FIG. 5b, the amplitude is represented in the vertical direction for the same frequency band. It is seen that the present invention achieves a much greater gain in the vertical direction in relation to the gain in the $\theta_0$ direction by using the criterion of directivity optimization according to the invention, which consists in minimizing a relation of average spectral densities of power (or amplitude).

In FIGS. 4a, 4b, 5a and 5b, all the sources are simultaneously activated. Nevertheless, according to the invention, the times of release for individual sources may be modified particularly to modify the angle $\theta$ along which it is desired to minimize the power transmitted. In the example of FIGS. 5a and 5b, the angle along which the power is minimized is equal to 30° (the angle whose sine is equal to the relation of speeds $v_1$ and $v_2$), but if each source is released respectively at times 0; 4 milliseconds; 8 milliseconds; 12 milliseconds, this angle increases to about 40°. In this manner, use is made of a method of regulating the angle along which it is desired to eliminate the most power, which is interesting when measurements are made on different terrains which can have varying bottom speeds.

Thus, the optimization of the power transmitted is carried out according to the variables in abscissas and in depths of the various individual sources and also according to the spaced release times of these different sources.

In this case, the formula used to calculate the power transmitted in the various directions by taking into account the release time $t_j$ of the sources $S_j$ becomes:

$$B_\theta(f) = \text{Modulus of } 2i \sum_{j=1}^{n} \sin (2\pi f \frac{P_j}{v_1} \cos \theta) e^{-2i\pi f (t_j - \frac{x_j}{1} \sin \theta)}$$

with for $\theta = 0$ $$B_0(f) = \text{Modulus of } 2i \sum_{j=1}^{n} \sin (2\pi f \frac{P_j}{v_1}) e^{-2i\pi f t_j}$$

and the function to be minimized by the appropriate choice of variables pj and/or tj is the average, simple or logarithmic, of $G_\theta(f) = B_\theta(f)/B_0(f)$ or of its square.

Summarizing the possibilities of the process of exploration according to the invention may be done in the following manner:

One can choose the source positions so as to minimize the transmitted power, more exactly an average spectral density of power in a limited band, in a chosen direction forming an angle $\theta$ with the vertical (the criterion of minimization being that indicated above, namely the minimization of the average of $F_\theta(f) = A_\theta(f)/A_0(f)$ in a determined frequency band).

Thus are obtained suitable positions for the sources defined by their abscissas xj and their depths pj. It is well understood that positions will be chosen which give as good a result as possible but the various known methods for optimizing the functions of several variables do not all lead to the same solution.

Having found the values xj and pj suitable for all the sources, one can use the process of the invention beginning with the thus positioned sources and releasing the sources at the same time, or releasing them at different times tj (j = 1 to n) chosen so as to reduce the power emitted by the sources in a direction $\theta'$ different than $\theta$.

For example, if a first measurement is made above a sea bottom at a speed of 3000 m/s, it is desired to eliminate the power transmitted along an angle of 30°; then another elementary measurement is made above another layer of terrain having a speed of 4000 m/s, in which case it is desired to eliminate the reflections and refractions along another angle $\theta$ (sin $\theta'$ = 1500/4000) without being obliged to modify the source positions. The spacings tj allow this problem to be resolved. The modification of angle $\theta$ can moreover be made for any other reason.

One criterion for the minimization of the power transmitted along the new direction $\theta'$, taking into account the waves reflected by the water-air interfaces of the surface of the sea, is the minimization or obtaining of a low value for the relation: $G_{\theta'}(f) = B_{\theta'}(f)/B_0(f)$ where $$B_{\theta'}(f) = \text{Modulus of } (2i \sum_{j=1}^{n} \sin(2\pi f \frac{p_j}{v_1} \cos\theta')e^{-2i\pi f(t_j - \frac{x_j}{v_1} \sin\theta')})$$

$$B_0(f) = \text{Modulus of } (2i \sum_{j=1}^{n} \sin(2\pi f \frac{p_j}{v_1}) e^{-2i\pi f t_j})$$

the positions xj and Pj already being fixed and the release times tj being chosen so as to minimize the average of the relation $G_{\theta'}(f)$ in a frequency band determined for a chosen angle $\theta'$.

Instead of first proceeding to a choice of optimal positions to eliminate reflections along a given angle $\theta$, one can also choose for any given source positions, for example all those at the same depth, the appropriate release times for the sources to eliminate as much as possible the reflections along angle $\theta$. With the positions xj and pj being fixed previously, one will thus minimize the average of the relation $G_\theta(f)$ defined hereinabove by an appropriate choice of times tj. The choice of these times is made in such a way that a relation $G_\theta(f)$ greater than that for sources released simultaneously is obtained. The same mathematical methods known for the optimization of the functions of several variables (here tj) are applied.

There again, the minimization of power transmitted in the direction chosen, preferably takes into account power reflected by the surface of the sea. In particular this is the case if one uses the function $G_\theta(f)$ indicated hereinabove.

Lastly, in the optimization one can still intervene with the amplitudes of each individual source as a supplementary variable, either in combination with the choice of positions and the release times, or independently one from another. The amplitudes thus intervene as coefficients of index term j of the summations of the formula $F_\theta(f)$ or $G_\theta(f)$.

A particularly preferred arrangement for the configuration of the sources to minimize the power emitted in the direction making an angle $\theta$ with the vertical is a configuration sensibly along a curved line having its concavity turned upwardly, this in the case where it is desired to eliminate the disturbances transmitted in the direction $\theta$ in a particular plane for seismic exploration which is the plane of this curved line (vertical plane), and is also the plane which contains a line of hydrophones H for the measurement of useful disturbances.

One can thus search to eliminate the waves transmitted along an angle $\theta$ in a plane other than that of the exploration made in the elementary measurement. In this case, the sources are arranged along a curved line in another plane (normally vertical).

Sources placed in an upwardly turned cup shaped configuration allow, in particular, elimination in several directions in space.

The sources are situated in a variable manner (diverse abscissas xj) along a curved line or lines.

Figure 6:
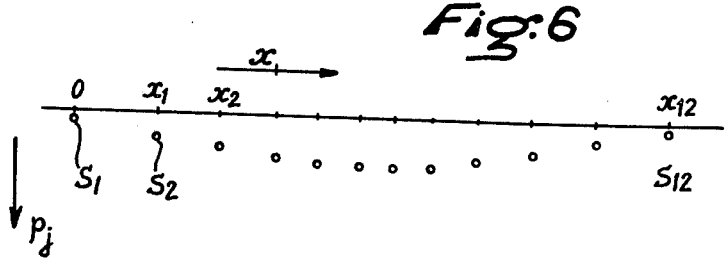
FIG. 6 represents a suitable configuration according to the invention for twelve sources.

An example of a configuration for 12 sources in the plane for seismic exploration and a 25 degree angle is given in FIG. 6. With this, we can obtain a gain of 30dB in the vertical direction in relation to the direction forming a 25 degree angle. The abscissas xj and depths pj are indicated hereinbelow.

Here it is seen that the sources are arranged in a curved line configuration, which configuration gives particularly favorable results.

| ABSCISSAS $x_j$ | | DEPTHS $p_j$ | |
|---|---|---|---|
| $x_1$ = | 0.0 m | $p_1$ = | 2.4 m |
| $x_2$ = | 28.4 m | $p_2$ = | 7.7 m |
| $x_3$ = | 51.3 m | $p_3$ = | 11.2 m |
| $x_4$ = | 68.9 m | $p_4$ = | 13.8 m |
| $x_5$ = | 83.3 m | $p_5$ = | 14.8 m |
| $x_6$ = | 97.2 m | $p_6$ = | 15.6 m |
| $x_7$ = | 109.8 m | $p_7$ = | 15.7 m |
| $x_8$ = | 123.3 m | $p_8$ = | 14.9 m |
| $x_9$ = | 137.9 m | $p_9$ = | 13.7 m |
| $x_{10}$ = | 155.7 m | $p_{10}$ = | 11.4 m |
| $x_{11}$ = | 178.3 m | $p_{11}$ = | 7.4 m |
| $x_{12}$ = | 204.1 m | $p_{12}$ = | 2.4 m |

The invention is applicable each time, for one reason or another, reflections or refractions originating from an emission at a particular angle $\theta$ must be eliminated to clarify the exploration results.

It can also be used to minimize the power transmitted along a particular angle $\theta$ or along a group of angles $\theta$, in particular, any array of angles above the critical angle of total reflection.

Lastly, if the principal application of the process according to the invention is in marine seismic exploration where the sea bottoms often have speeds much greater than that of water, the use of the process for terrestrial exploration is also envisaged when there is need to eliminate emissions in certain directions.

I claim:

1. A process of seismic exploration in an environment comprising at least one subsoil layer, a medium capable of propagating seismic disturbances superimposed on said subsoil layer, and a terrestrial atmosphere superimposed on said medium, wherein each elementary measurement of the exploration comprises the steps of:

positioning a plurality of seismic disturbance sources Sj (j = 1 to n) in spaced relation in said medium at various depths in relation to the interface of said medium with said terrestrial atmosphere;

positioning seismic collectors to receive seismic signals resulting from reflections of said disturbances propagated in said subsoil;

emitting seismic disturbances from said sources; and receiving at said collectors said disturbances reflection signals, wherein positioning said sources further comprises selecting the respective source depths and spacings so that the average ratio $F_\theta(f)$ of the spectral density $A_\theta(f)$ of seismic disturbance power transmitted in a predetermined direction to the spectral density $A_0(f)$ of seismic disturbance power transmitted vertically downwardly, for a predetermined band of frequencies, is less than about $-20$ dB, where $A\theta(f)$ = modulus of $$[2i \sum_{j=1}^{n} \sin(2\pi f \frac{P_j}{v_1} \cos\theta) e^{2i\pi f \frac{x_j}{v_1} \sin\theta}]$$

and $A_0(f)$ = modulus of $$[2i \sum_{j=1}^{n} \sin(2\pi f \frac{P_j}{v_1})],$$

n being the number of sources, Xj (j = 1 to n) and Pj (j = 1 to n) being respectively the abcissas and depths of the respective sources, $v_1$ being the propagation speed of seismic disturbances in said medium, f being a frequency in the spectral band of the disturbances emitted by the sources, and $\theta$ being the angle between the vertical and said predetermined direction.

2. The process of claim 1, further comprising the step of registering in a given time interval the compound signals resulting from superposition of reflections of the various disturbances emitted during the elementary measurement.

3. The process of claim 1 wherein said medium comprises a liquid.

4. The process of claim 1 wherein said medium comprises a solid.

5. The process of claim 1, wherein the positions selected for said sources are positions for which the function $F_\theta(f)$ for a band of frequencies of about 1 octave has an average value less than about $-20$dB.

6. The process of claim 1, wherein said sources are simultaneously activated to emit seismic disturbances.

7. The process of claim 1 wherein said sources are activated to emit seismic disturbances at respective times tj (j = 1 to n) from a common temporal origin, said times tj being chosen such that the function $G_{\theta'}(f) = B_{\theta'}(f)/B_0(f)$ will be on the average appreciably less than 1 for said predetermined band of frequencies, with $$B_{\theta'}(f) = \text{modulus of } (2 \sum_{j=1}^{n} \sin(2\pi f \frac{P_j}{v} \cos\theta') e^{-2i\pi f(t_j - \frac{x_j}{v}\sin\theta')})$$

and $B_0(f)$ = modulus of $(2 \sum_{j=1}^{n} \sin(2\pi f \frac{P_j}{v}) e^{-2i\pi f t_j})$, wherein $\theta'$ is an angle equal to or not equal to $\theta$ between the vertical and a direction along which it is desired that the spectral density of seismic disturbance power transmitted will be appreciably less than the spectral density of seismic disturbance power transmitted vertically downwardly.

8. The process of claim 7 wherein the sine of angle $\theta'$ is substantially equal to the ratio of the propagation speed of seismic disturbances in said medium to the propagation speed of seismic disturbances in at least one of said subsoil layers.

9. The process of claim 7 wherein the groups of values tj (j = 1 to n) are varied from one said elementary measurement to the next in order to vary said angle $\theta'$, whereby the direction for which said ratio of average spectral densities is minimized is also varied from one elemental measurement to the next.

10. The process of claim 1 wherein the sine of the angle between said predetermined direction and the vertical is substantially equal to the ratio of the propagation of seismic disturbances in said medium to the propagation speed of seismic disturbances in at least one of said subsoil layers.

11. The process of claim 1 wherein said sources have various respective seismic disturbance emission amplitudes, said amplitudes being chosen so as to increase the ratio of the average spectral density of seismic disturbance power transmitted vertically downwardly to the average spectral density of seismic disturbance power transmitted in said predetermined direction over the value of this ratio for sources having uniform seismic disturbance emission amplitudes.

12. A process of seismic exploration in an environment comprising at least one subsoil layer, a medium capable of propagating seismic disturbances superimposed on said subsoil layer, and a terrestrial atmosphere superimposed on said medium, wherein each elementary measurement of the exploration comprises the steps of:

positioning a plurality of seismic disturbances sources within said medium along at least one curved line, said line having upwardly turned concavity;

positioning seismic collectors to receive seismic signals resulting from reflections of said disturbances propagated in said subsoil;

emitting seismic disturbances from said sources, and receiving at said collectors said disturbance reflection signals.

13. The process of claim 12, further comprising registering in a given time interval the compound signals resulting from superposition of reflections of the various disturbances emitted.

14. The process of claim 12 wherein said medium is a liquid.

15. The process of claim 12 wherein said medium is a solid.

16. The process of claim 12 wherein said sources are in spaced relation along said line.

17. The process of claim 16 wherein the spacing between said sources varies along said line.

18. The process of claim 16 wherein the respective positions of said sources are chosen such that the average spectral density of seismic disturbance power transmitted in a predetermined non-vertical direction is appreciably less than the average spectral density of seismic disturbance power transmitted vertically downwardly, said average spectral densities being for a predetermined band of frequencies.

19. The process of claim 18 wherein the sine of the angle between said predetermined non-vertical direction and the vertical is substantially equal to the ratio of the propagation speed of seismic disturbances in said medium to the propagation speed of seismic disturbances in at least one of said subsoil layers.

20. The process of claim 18 wherein the emission of disturbances from the various sources is made at various times with respect to a temporal origin, said times being chosen so as to reduce the ratio of the average spectral density of seismic disturbance power transmitted in said predetermined non-vertical direction to the average spectral density of seismic disturbance power in the vertical direction from the value of said ratio for simultaneous emission of seismic disturbances from said sources.

21. The process of claim 12 wherein said curved line is in a substantially vertical plane.

22. The process of claim 12 wherein said plurality of sources is positioned along a plurality of curved lines so as to define a cup-shaped configuration having upwardly-turned concavity.

23. An arrangement for seismic exploration in an environment comprising at least one subsoil layer, a medium capable of propagating seismic disturbances superimposed on said subsoil layer, and a terrestrial atmosphere superimposed on said medium, comprising:
a plurality of seismic disturbance sources positioned in spaced relation in said medium at various depths in relation to the interface of said medium with said terrestrial atmosphere and along at least one curved line, said curved line having upwardly turned concavity, the positions of said sources being such that the ratio of the average spectral density of seismic disturbance power transmitted vertically downwardly by the plurality of sources to the average spectral density of seismic disturbance power in a predetermined non-vertical direction, for a predetermined band of frequencies, will be greater than the value of this ratio for a plurality of sources positioned at a uniform depth.

* * * * *